(12) United States Patent
Shindou

(10) Patent No.: US 10,656,621 B2
(45) Date of Patent: *May 19, 2020

(54) INFORMATION PROCESSING DEVICE

(71) Applicant: FANUC CORPORATION, Minamitsuru-gun, Yamanashi (JP)

(72) Inventor: Masaaki Shindou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 52 days.

This patent is subject to a terminal disclaimer.

(21) Appl. No.: 15/944,417

(22) Filed: Apr. 3, 2018

(65) Prior Publication Data

US 2018/0292807 A1    Oct. 11, 2018

(30) Foreign Application Priority Data

Apr. 6, 2017    (JP) ................. 2017-076203

(51) Int. Cl.
    *G06F 17/00*    (2019.01)
    *G05B 19/4069*    (2006.01)

(52) U.S. Cl.
    CPC ........... *G05B 19/4069* (2013.01); *G05B 2219/35336* (2013.01); *G05B 2219/35481* (2013.01)

(58) Field of Classification Search
    USPC ....................................................... 700/180
    See application file for complete search history.

(56) References Cited

U.S. PATENT DOCUMENTS

| 6,266,572 | B1 | 7/2001 | Yamazaki et al. |
| 2011/0015877 | A1* | 1/2011 | Okita ........... G05B 19/409 702/41 |
| 2012/0265330 | A1* | 10/2012 | Beck ............ G05B 19/4068 700/95 |

(Continued)

FOREIGN PATENT DOCUMENTS

| CN | 104570903 A | 4/2015 |
| CN | 105785912 A | 7/2016 |

(Continued)

OTHER PUBLICATIONS

Notification of Reasons for Refusal for Japanese Application No. 2017-076203, dated Dec. 25, 2018, with translation, 8 pages.

(Continued)

*Primary Examiner* — Md Azad
(74) *Attorney, Agent, or Firm* — RatnerPrestia

(57) ABSTRACT

An information processing device is provided that enables an operator to efficiently carry out revision of an amount of removal of a workpiece at each block of a machining program. The information processing device includes a design data storage unit configured to store at least information relating to a workpiece, a simulation unit configured to carry out a simulation process of reproducing a positional relationship between the tool and the workpiece in a virtual space, a removal amount calculation unit configured to calculate an amount of removal of the workpiece by each block included in the machining program, the amount of removal being calculated on a per-block basis, and a display unit configured to display the blocks included in the machining program in a machining program display field in different display modes in accordance with the amounts of removal of the workpiece by the blocks.

3 Claims, 5 Drawing Sheets

(56) References Cited

U.S. PATENT DOCUMENTS

| | | | | |
|---|---|---|---|---|
| 2012/0290122 | A1* | 11/2012 | Morfino | G05B 19/4069 700/184 |
| 2013/0253694 | A1 | 9/2013 | Chung et al. | |
| 2013/0338809 | A1* | 12/2013 | Kume | G05B 19/4155 700/97 |
| 2014/0180467 | A1 | 6/2014 | Sato et al. | |
| 2015/0102836 | A1 | 4/2015 | Song et al. | |
| 2015/0268661 | A1* | 9/2015 | Ogawa | G05B 19/4097 700/182 |
| 2017/0242423 | A1* | 8/2017 | Oya | G05B 19/0426 |

FOREIGN PATENT DOCUMENTS

| | | |
|---|---|---|
| GB | 2323950 A | 10/1998 |
| JP | H05324043 A | 12/1993 |
| JP | H07160317 A | 6/1995 |
| JP | H0962326 A | 3/1997 |
| JP | H10230436 A | 9/1998 |
| JP | H1128640 A | 2/1999 |
| JP | H1133726 A | 2/1999 |
| JP | 2001-051705 A | 2/2001 |
| JP | 2001192513 A | 4/2001 |
| JP | 2004126956 A | 4/2004 |
| JP | 2009098982 A | 5/2009 |
| JP | 2012014601 A | 1/2012 |
| JP | 2013037383 A | 2/2013 |
| JP | 2014126939 A | 7/2014 |
| JP | 2015225617 A | 12/2015 |
| JP | 2017041041 A | 2/2017 |
| WO | 9819822 A1 | 5/1998 |
| WO | 2015029218 A1 | 3/2015 |

OTHER PUBLICATIONS

Chinese Office Action for Chinese Application No. 201810301900.8, dated Aug. 12, 2019, with translation, 13 pages.

Decision to Grant a Patent for Japanese Application No. 2017-076178, dated Jan. 8, 2019, with translation, 6 pages 2019.

* cited by examiner

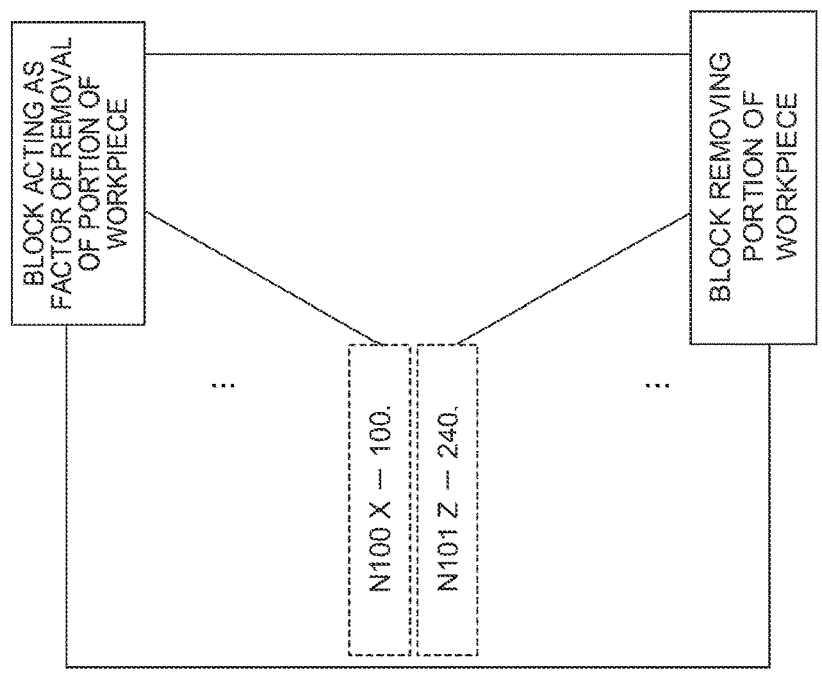
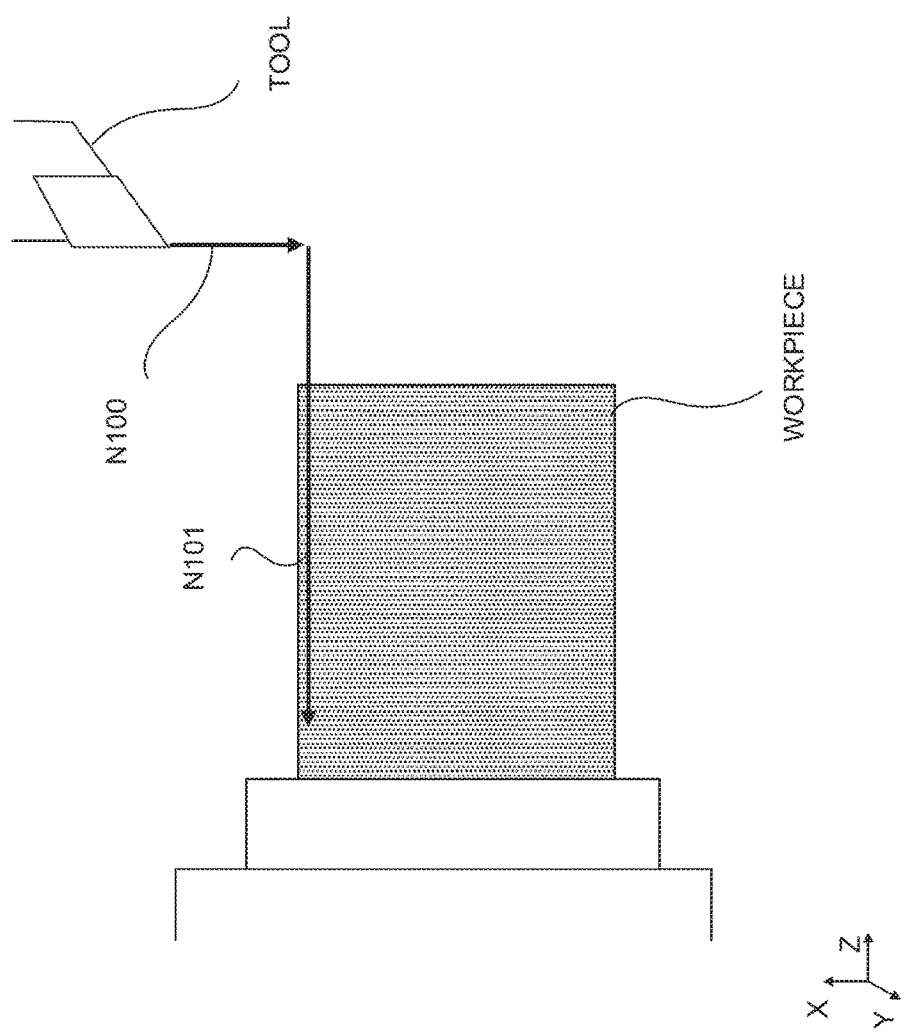
FIG.3

INFORMATION PROCESSING DEVICE

CROSS-REFERENCE TO RELATED APPLICATION

This application is a new U.S. Patent Application that claims benefit of Japanese Patent Application No. 2017-076203, filed Apr. 6, 2017, the disclosure of this application is being incorporated herein by reference in its entirety for all purposes.

BACKGROUND OF THE INVENTION

Field of the Invention

The present invention relates to an information processing device, and in particular to an information processing device for displaying a removal amount when a workpiece is machined.

Description of the Related Art

Machining simulation is an approach to obtaining a result of machining without actual machining on a machine tool. The machining simulation enables reproduction of a result of machining of a workpiece and state of interference of a tool and the workpiece by analyzing a machining program in the same manner as in the actual machining and reproducing a positional relationship between the workpiece and the tool, which makes it possible to ascertain any problem in the machining program.

In this context, in a cutting process in accordance with the machining program, a cutting load of the tool is guessed to become larger according to an amount of removal of the workpiece. A large cutting load of the tool leads to decrease in tool life and eventually breakage of the tool. Thus, a cutting process that involves a large cutting load should be avoided.

Japanese Patent Laid-Open No. 2001-051705, for example, as a conventional technique related to the amount of removal of the workpiece in cutting, discloses a technique of analyzing an NC program (machining program) of a cutting machine and indicating an estimate value of a total cutting amount of a workpiece by the NC program (the amount of removal of the workpiece).

While the conventional technique disclosed in Japanese Patent Laid-Open No. 2001-051705 allows an operator to recognize the total amount of the removal of the workpiece in the machining process carried out by the machining program, the problem is that the operator cannot recognize the amount of removal of the workpiece at each block of the machining program, so that the operator cannot recognize which block of the machining program needs to be revised. The problem in particular is that, when performing tasks for revising a block where the amount of removal of the workpiece is larger for a machining program including numerous blocks, it is not possible to readily understand at a glance which block should be revised to efficiently reduce the cutting load of the tool among the blocks for cutting of the workpiece and the blocks related to the cutting, for these blocks are dispersed across the machining program.

SUMMARY OF THE INVENTION

It is therefore an object of the present invention to provide an information processing device that enables an operator to efficiently revise an amount of removal of a workpiece at each block of a machining program.

In accordance with the present invention, in order to solve the above-described problem, when the blocks of the machining program is to be indicated, indication is provided such that the blocks are colored according to amounts of removal of the workpiece at the respective blocks, and it is made possible for the operator to readily recognize the target block to be revised.

In addition, an embodiment of the present invention is an information processing device for simulating an operation of a tool based on a machining program, the device including a design data storage unit configured to store at least information relating to a workpiece, a simulation unit configured to carry out a simulation process of reproducing a positional relationship between the tool and the workpiece in a virtual space based on the information relating to the workpiece and the machining program, a removal amount calculation unit configured to calculate, based on a result of the simulation process, an amount of removal of the workpiece by each block included in the machining program, wherein the amount of removal being calculated on a per-block basis, and a display unit configured to display the blocks included in the machining program in a machining program display field in different display modes in accordance with the amounts of removal of the workpiece by the blocks.

According to the present invention, by virtue of the measurement of the removal amount by simulation process and the indication presented based on the measured removal amount, it is made possible to readily detect excessive cutting in the machining program, thereby reducing operator's labor.

BRIEF DESCRIPTION OF THE DRAWINGS

The foregoing and other objects and features of the present invention will become apparent from the following description of embodiments with reference to the accompanying drawings, in which:

FIG. 3 is a diagram illustrating a removal factor block;

DETAILED DESCRIPTION OF THE PREFERRED EMBODIMENTS

A configuration example of the information processing device for implementing the present invention will be illustrated below. Meanwhile, the configuration of the information processing device according to the present invention is not limited to those illustrated herein, and any appropriate configuration may be adopted as long as it can achieve the object of the present invention.

Figure 1:
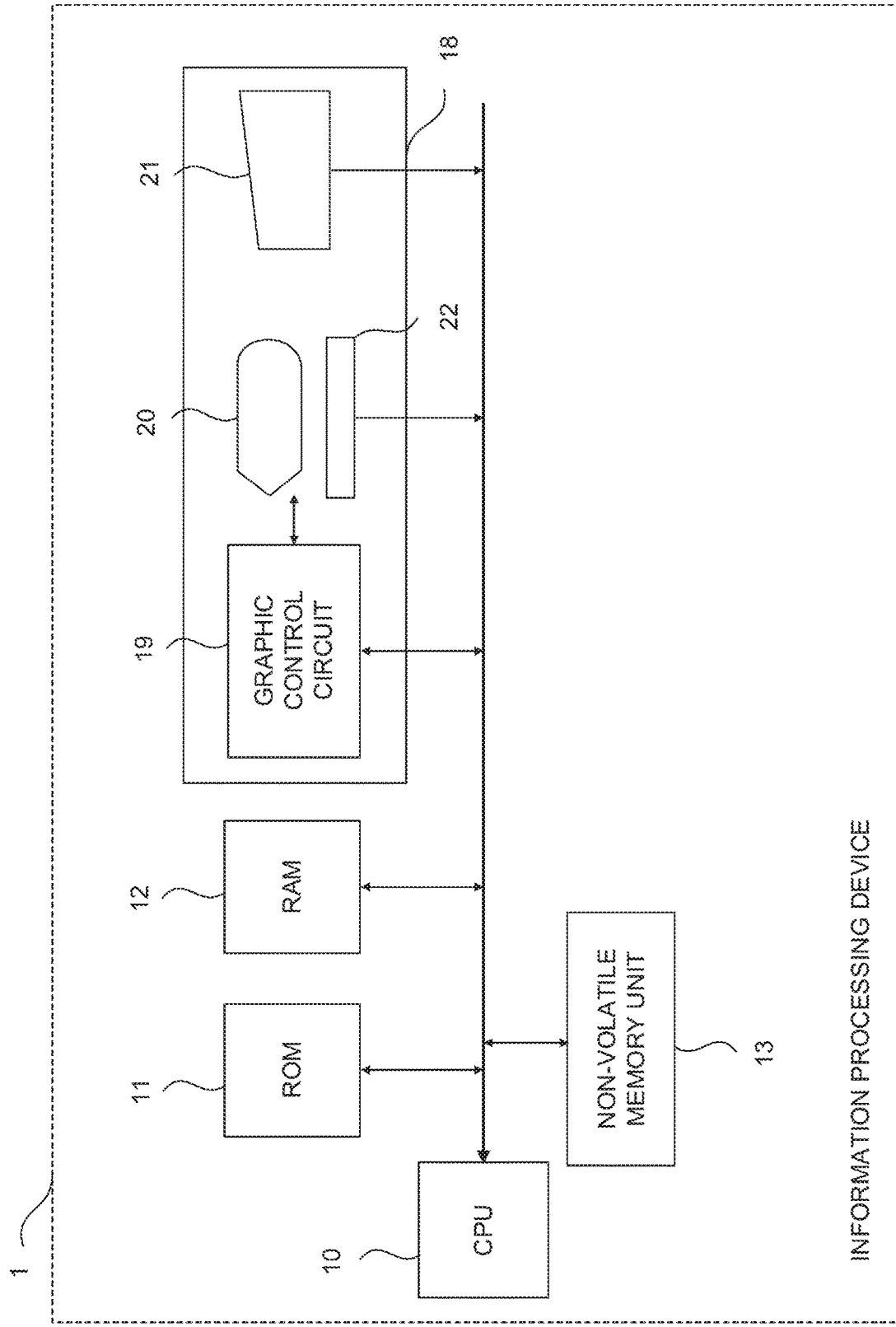
FIG. 1 is a schematic hardware configuration diagram illustrating a main part of an information processing device according to an embodiment of the present invention.

FIG. 1 is a hardware configuration diagram that illustrates a main part of an information processing device according to an embodiment of the present invention. The information processing device 1 can be configured as a personal computer (PC) a numerical control device, a machining program editing device, or the like having simulation functionality.

The information processing device 1 includes a central processing unit (CPU) 10 as its core component. (CPU) 10 controls the entire information processing device 1 in accordance with a system program stored in read only memory (ROM) unit 11. Erasable programmable read only memory (EPROM) or electrically erasable programmable read only memory (EEPROM) may be used to configure the unit 11.

Dynamic random access memory (DRAM) or the like is used to configure a random access memory (RAM) unit 12, and temporary calculation data, display data, input/output signals, and the like are stored therein. Storage devices such as complementary metal oxide semiconductor (CMOS), static random access memory (SRAM), or hard disk drive (HDD) backed up by a battery (not shown) may be used to configure a non-volatile memory unit 13, and parameters to be held even after the power supply is stopped, machining programs, and the like are stored therein.

A user interface unit 18 is used to display data and drawings, enter data, and operate the information processing device 1. A graphic control circuit 19 is configured to convert digital signals such as numerical data and graphic data into raster signals for indication and send them to a display device 20, and the display device 20 in turn displays these numerical values and drawings. A liquid crystal display device is typically used as the display device 20.

The input device 21 includes a keyboard having a numeric key, a symbolic key, a character key, and a function key, and a pointing device such as a mouse, and is used to create and edit a machining program and to operate the information processing device 1.

A touch panel 22 has functionality of detecting an operation such as touch or drag by an operator. The touch panel 22 is arranged on and overlapped with a screen of the display device 20 and allows the operator to detect the operation performed on a software key, a software button, and a software switch displayed on the screen of the display device 20 through the touch panel 22. The touch panel 22 is not indispensable to the information processing device 1, and may be provided as necessary. It should also be noted that the touch panel 22 and the display device 20 may be combined into one single component.

Figure 2:
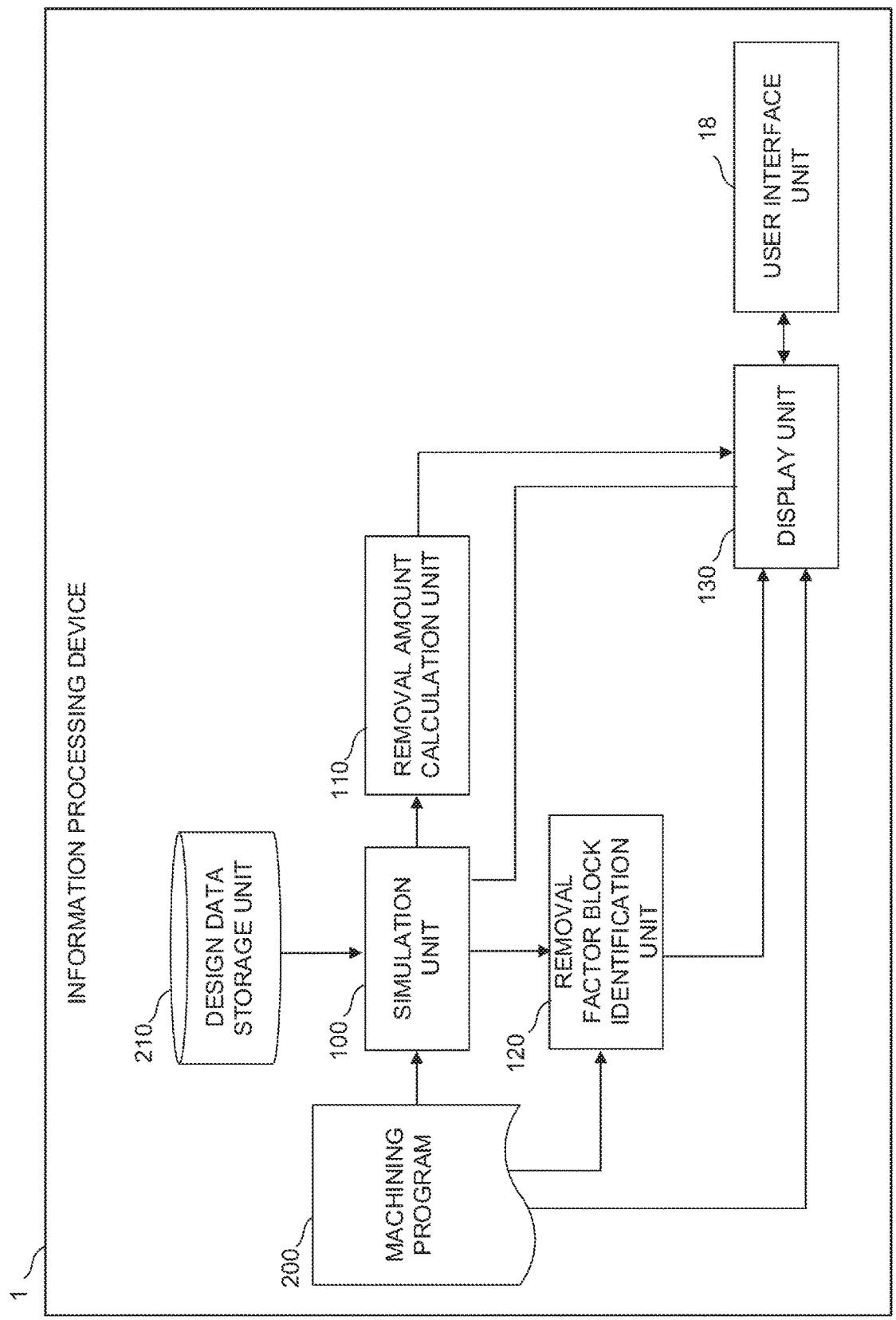
FIG. 2 is a schematic functional block diagram of an information processing device according to an embodiment of the present invention.

FIG. 2 is a schematic functional block diagram of an information processing device according to an embodiment of the present invention in a case where the system program for implementing the machining program display functionality based on the removal amount is installed on the information processing device 1 illustrated in FIG. 1. The functional blocks illustrated in FIG. 2 are implemented by the CPU 10 included in the information processing device 1 illustrated in FIG. 1 executing the system program to control operation of each section of the information processing device 1. The information processing device 1 according to the present embodiment includes a simulation unit 100, a removal amount calculation unit 110, a removal factor block identification unit 120, and a display unit 130 and, in addition, a design data storage unit 210 that is an area for storing design data output from computer aided design (CAD) computer aided manufacturing (CAM) unit (not shown) or the like is provided on the non-volatile memory unit 13.

The simulation unit 100 sequentially reads command blocks included in a machining program 200 from the non-volatile memory unit 13, analyzes the command blocks that have been read, and executes a simulation process of reproducing a positional relationship between a workpiece and a tool in a virtual space. When the simulation is carried out, the simulation unit 100 reads information on the workpiece (the shape of the workpiece, etc.) from design data stored in the design data storage unit 210 and uses the information for the simulation process. Since the simulation process carried out by the simulation unit 100 is known in conventional techniques, details of which will not be described in this specification.

The removal amount calculation unit 110 calculates an amount of removal by which a portion of the workpiece is to be removed at each block of the machining program 200 based on a result of the simulation process carried out by the simulation unit 100. The removal amount calculation unit 110 calculates the amount of removal of the workpiece by which a portion thereof should be removed as a result of execution of the block, where the amount of removal is calculated on the basis of the shape of the workpiece prior to starting execution of the block and the portion of the workpiece interfering with a path along which the tool travels as the block is executed. The removal amount calculation unit 110 may further calculate the removal amount per unit time when each block of the machining program 200 is being executed.

The removal factor block identification unit 120 identifies, among the respective blocks of the machining program, a block that acts as a factor causing the amount of removal. The removal factor block identification unit 120, for example, as illustrated in FIG. 3, on the basis of the result of the simulation process carried out by the machining program 200 and the simulation unit 100, may identify the closest block (N100 in FIG. 3) which moves in a direction along an axis that is different than an axis of a moving direction of the tool by the block where the removal of the workpiece occurred (N101 in FIG. 3) as the block causing the amount of removal.

In addition, the removal factor block identification unit 120 may identify the axis of a depth direction of cutting (an X-axis direction in FIG. 3) in the block where the removal amount occurs based on, for example, the result of simulation process, and identify the closest block (N100 in FIG. 3) where the tool moves in the axis direction as the block acting as the factor causing the amount of removal.

The display unit 130 creates display data to be displayed on the screen based on the result of the simulation process carried out by the simulation unit 100 and the removal amount of the work for each block calculated by the removal amount calculation unit 110 and displays the display data on the display device 20 of the user interface unit 18. In addition, the display unit 130 changes indication on the screen according to an operator's screen indication switching operation, search operation, or the like on the user interface unit 18.

Figure 4:
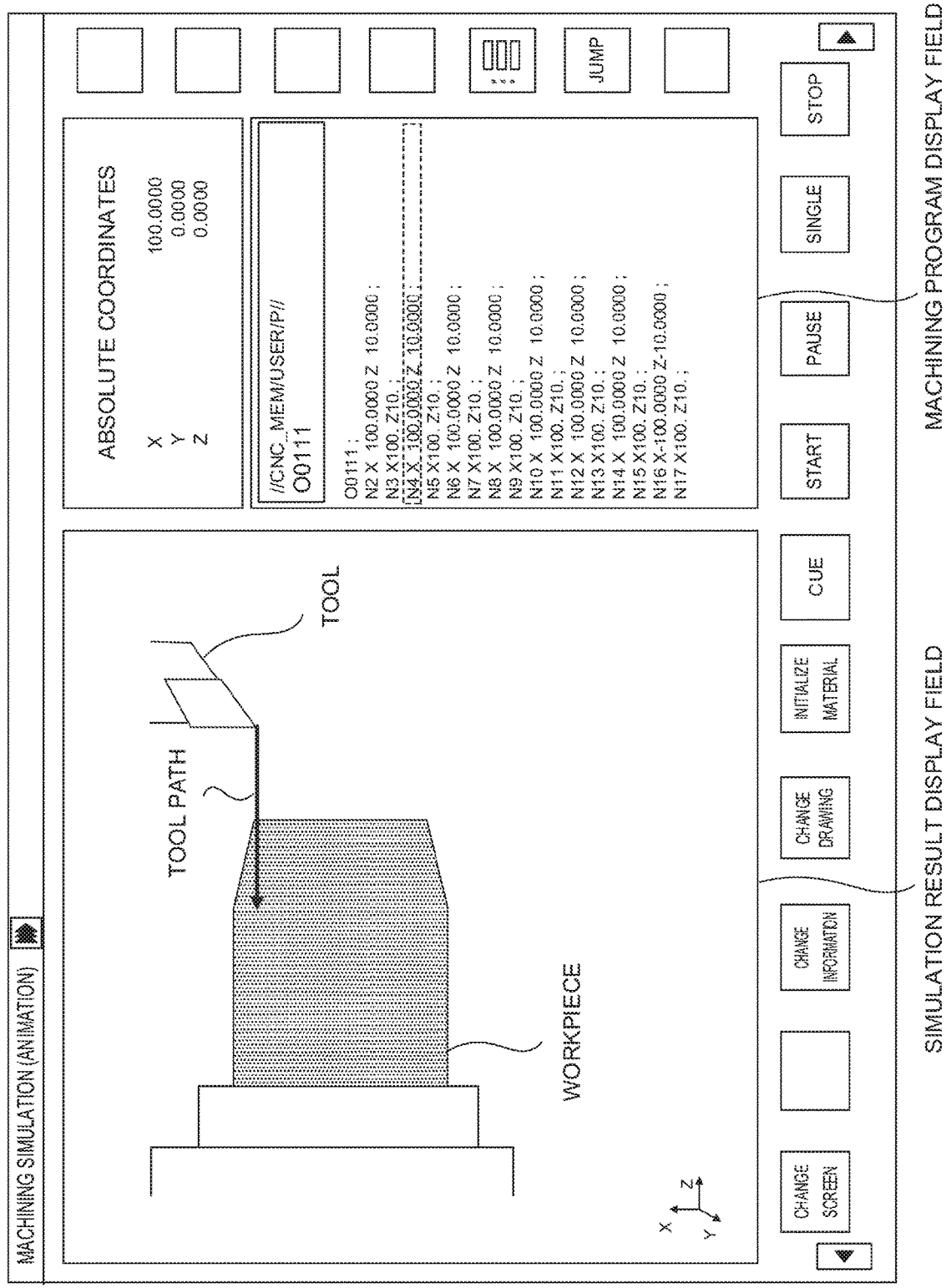
FIG. 4 is an example of indication of a machining program based on an amount of removal of a workpiece according to an embodiment of the present invention.

FIG. 4 is an example of a screen display where the user interface unit 18 displays a machining simulation screen on the display device 20 based on the display data created by the display unit 130. The machining simulation screen illustrated by way of example in FIG. 4 includes a simulation result display field for displaying the result of the simulation process carried out by the simulation unit 100 and a machining program display field for displaying the machining program 200. The machining simulation screen illustrated by way of example in FIG. 4 is configured such that the movement of the tool when blocks of the machining program 200 are executed sequentially starting from its beginning block and the tool path are allowed to be sequentially displayed. The movement and the path of the tool can be displayed while the blocks are executed one at a time for every lapse of a predetermined time period, or while the blocks are executed one after another every time a software button on the screen (a "single" button in FIG. 3) is selected.

In the simulation result display field, the workpiece and the tool arranged by the simulation unit 100 in the virtual space and the tool path instructed by the machining program of the tool are displayed.

In the machining program display field, the machining program 200 which is the target of the simulation process is displayed. The machining program 200 displayed in the machining program display field is displayed such that the currently executed block can be recognized (in FIG. 4, the block indicated with a dotted line frame represents the block currently being executed). Although not shown in FIG. 4, in the machining program display field, each block of the machining program 200 displayed in the machining program display field is displayed with display modes changed according to the amount of removal of the workpiece to be removed by the block. For example, several threshold values may be set in advance and the block may be displayed in white if the removal amount of the workpiece is 0 or equal to or less than a threshold value $S_1$, in yellow if the removal amount of the workpiece is larger than the threshold value $S_1$ but equal to or less than another threshold value $S_2$, and in red if the removal amount of the workpiece is larger than the threshold value $S_2$. In addition, for example, statistics on the amount of removal to be removed from the workpiece in each block may be taken and the display mode may be changed in accordance with the ratio of the removal amount of the workpiece in the block to the total value (total amount of removal) of the amounts of removal for the entire workpiece.

According to the above-described display example, since the operator can recognize the outline and tendency of the amount of removal of the workpiece at each block simply by viewing the machining program 200 displayed in the machining program display field, the block for which the workpiece removal amount should be improved can be readily identified from the machining program 200.

As a modified example of the information processing device according to the present embodiment, each block of the machining program 200 displayed in the machining program display field may be displayed with the display modes changed according to the maximum value of the removal amount per unit time of the workpiece by the block. For example, several threshold values are set in advance, and the block may be displayed in white if the maximum value of the removal amount per unit time of the workpiece is 0 to the threshold value $St_1$ or less, the block may be displayed in yellow if the maximum value of the removal amount per unit time of the workpiece is larger than the threshold value $St_1$ but equal to or less than the threshold value $St_2$, the block may be displayed in red if the maximum value of the removal amount per unit time of the workpiece is larger than the threshold value $St_2$.

According to the above display example, since the operator can recognize the outline and trend of the maximum value of the removal amount per unit time of the workpiece in each block merely by viewing the machining program 200 displayed in the machining program display field, it is possible to easily identify the block whose amount of removal of the workpiece should be improved from the machining program 200.

Figure 5:
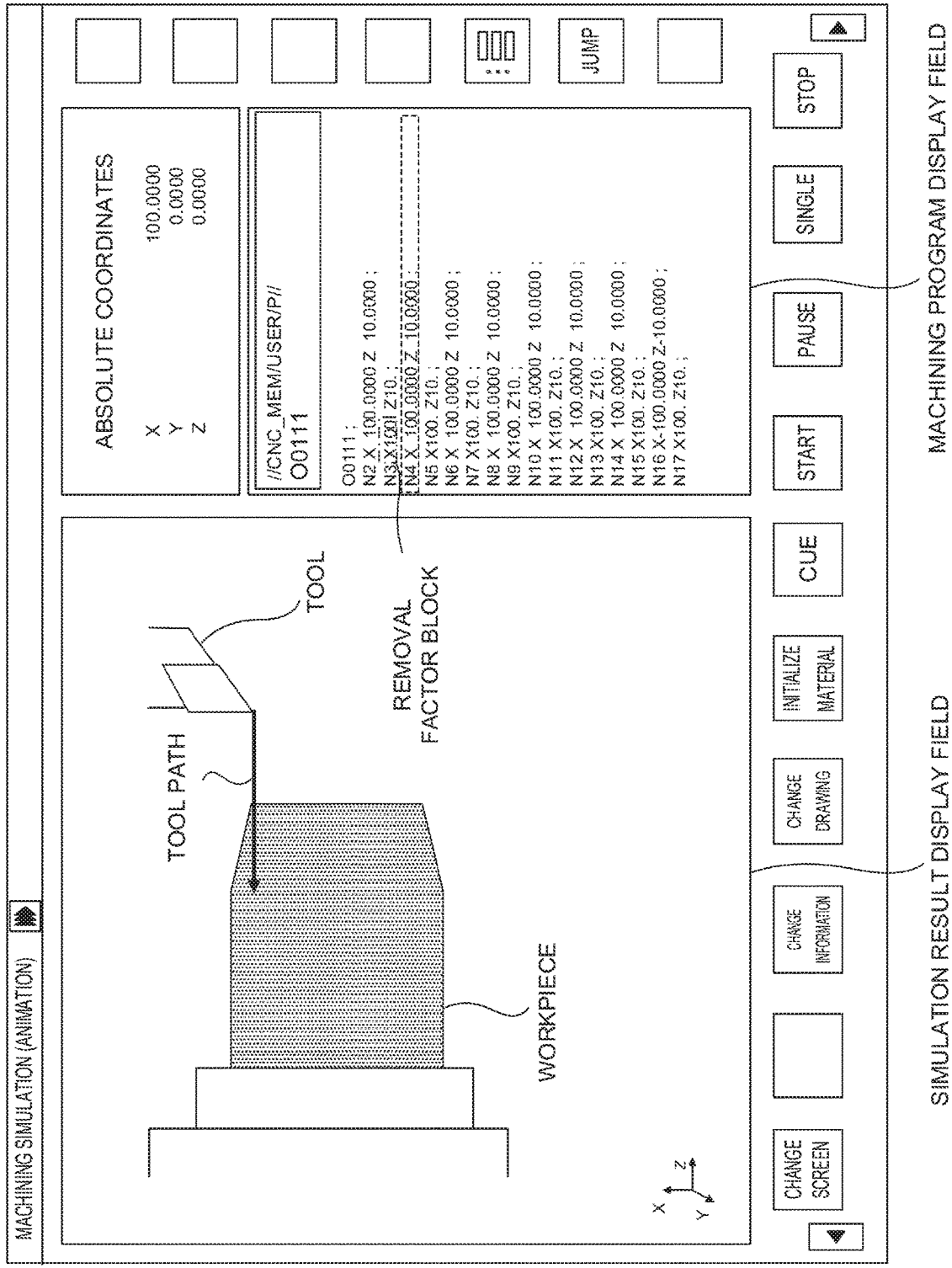
FIG. 5 is a modified example of indication of the machining program based on the removal amount of the workpiece of the present invention.

As another modified example of the information processing device according to the present embodiment, as shown in FIG. 5, for a selected block of the machining program 200 displayed in the machining program display field, the block may be displayed in such a manner that the removal factor block as a factor of removal of the portion of the workpiece by the block is distinguishable. The removal factor block may also be displayed such that the entire block is distinguishable, or only the relevant portion instructing the movement of the axis acting as the factor of the removal within the block may be distinguishably displayed.

According to the modified example, the operator can readily recognize which block should be edited to change the removal amount of the selected block for the selected block of the machining program 200 displayed in the machining program display field.

As another modified example of the information processing device of the present embodiment, the block whose amount of removal of the workpiece is largest among the respective blocks of the machining program 200 displayed in the machining program display field may be selectively displayed by the operator performing a predetermined operation (for example, in the display examples of FIGS. 4 and 5, the operation of selecting a jump button displayed to the right side). In addition, the blocks may be selected and displayed in descending order of the amount of removal of workpieces among the blocks of the machining program 200 displayed in the machining program display field every time a predetermined number of operations are continuously performed by the operator.

According to the above-described modified example, the operator can recognize and edit a block having a large amount of removal of the workpiece among the blocks included in the machining program 200 by performing a predetermined operation.

Although the embodiments of the present invention have been described above, the present invention is not limited only to the examples of the above-described embodiments, and can be implemented in various modes with modifications made as appropriate thereto.

The invention claimed is:

1. A numerical controller for simulating and controlling an operation of a tool based on a machining program, the device comprising:
   a processor configured to:
      store, in a memory device, at least information relating to a workpiece;
      carry out a simulation process of reproducing a positional relationship between the tool and the workpiece in a virtual space based on the information relating to the workpiece and the machining program;
      calculate, based on a result of the simulation process, an amount of removal of the workpiece by each block included in the machining program, the amount of removal being calculated on a per-block basis; and
      display, on a display device, each of the blocks included in the machining program in a machining program display field in a respective display mode, the respective display mode for each of the blocks is determined by comparing the amount of removal for each of the blocks to at least one threshold indicating a predetermined amount of removal,
   wherein the processor is further configured to identify, for each block included in the machining program, a block that acts as a factor causing the amount of removal of the workpiece within the block from the blocks of the machining program on the basis of the machining program and the result of the simulation process, and wherein when the machining program is displayed, the processor is further configured to display on the display device the block acting as the factor causing the amount of removal of the workpiece by the block included in the machining program in a display mode in which the block acting as the factor causing the amount of removal of the workpiece is allowed to be distinguished from other blocks.

2. The information processing device according to claim 1, wherein the processor is further configured to display on the display device the blocks included in the machining program in different display modes according to a maximum value of the amounts of removal per unit time of the workpiece by the blocks.

3. The information processing device according to claim 1, wherein the processor is further configured to selectively display on the display device a block having a largest amount of removal of the workpiece out of the blocks included in the machining program on the basis of an operation of an operator.

* * * * *